Patented Jan. 16, 1951

2,538,302

UNITED STATES PATENT OFFICE 2,538,302

LIGNIN-FURFURYL ALCOHOL RESINS AND PROCESS OF MAKING SAME

Raymond Norris Evans and Angelo Paul Ingrassia, Laurel, Miss., assignors to Masonite Corporation, Laurel, Miss., a corporation of Delaware No Drawing. Application June 3, 1946, Serial No. 674,034

4 Claims. (Cl. 260—17.4)

This invention relates to resins having high resistance to alkali and water, and made from components comprising lignin in substantial proportions, and the methods of making and using such resins.

By the present invention, lignin which is readily soluble in alkali, forming dark-colored solutions, is reacted with furfuryl alcohol in the presence of a catalyst, and resin is obtained which is resistant to alkali, and also resistant to absorption of water. The reaction between the lignin and the furfuryl alcohol is carried out in the presence of a catalyst such as iodine, boron trifluoride, or acid catalysts such as phthalic, formic, phosphoric, oxalic, maleic, lactic, acetic, furoic, hydrochloric, sulfuric, and similar acids.

The resins prepared in accordance with the present invention may be used alone or together with other resinous materials in various ways, as in the preparation of solutions for impregnating and laminating purposes, or in the preparation of protective coatings and varnishes or for the formation of molded articles. In connection with molding, the resin may be used with or without suitable fillers. Fibrous laminae bonded together with the cured resins of the present invention have strong laminating bonds with low water absorption characteristics. The cured resins are especially effective as laminating material in the production of laminated paper, hardboard, plywood, in bonded laminates and in bonding wood veneer with plastics, metals, wood, fibrous boards, and the like, and in protective coatings for material in sheet, wire and other forms. The resins are also effective for addition to hydrolyzed ligno-cellulose fiber materials which are to be formed into sheet products under heat and pressure and in such cases, the lignin component of the resin may be supplied or supplied in part by the ligno-cellulose fiber thus making it possible for the lignin resin to be formed in situ.

The main objects of the invention are the separation of resin made from lignin and furfuryl alcohol in the presence of a suitable catalyst, and of products containing such resin and acid-hydrolyzed ligno-cellulose fiber, which resins and products are of high alkali resistance, and are resistant to absorption of water, and the provision of methods for the production of such resins and resin-containing products.

In carrying out the present invention, lignin is caused to react and condense with furfuryl alcohol in the presence of a suitable catalyst. The reaction is carried out at an elevated temperature although in the presence of some catalysts, as for example, iodine, the reaction is exothermic and under such conditions no external heat need be applied. The furfuryl alcohol may be heat treated to be partially polymerized before use thereof as one of the components of the reaction.

The proportions of the reactants may vary within fairly wide limits. The quantity of lignin may be up to about 60%, preferably about 20 to 40%, based upon the weight of the furfuryl alcohol. The quantity of catalyst may be up to about 3%, preferably about 1 to 1½%, based on the weight of furfuryl alcohol.

The soluble lignin used in the reaction is preferably provided by subjecting wood or other ligno-cellulose material to hydrolysis in the presence of mild acids. The acid-hydrolyzed ligno-cellulose material is preferably prepared by subjecting wood chips to the action of high-pressure steam in a closed chamber, as for example a gun, as described in U. S. Patent to Mason, No. 1,824,221. In such treatment, organic acids such as acetic and formic acids are formed, and acid hydrolysis of the ligno-cellulose material is effected, with lignin being set free. After treatment with steam, the contents of the gun are disintegrated, preferably by being explosively discharged from the region of high steam pressure to a region of substantially atmospheric pressure. Material so produced has a pH of about 3 to 4. The time required for the steam treatment decreases rapidly with increase of the steam pressure used. For example, 25 minutes treatment with steam at 275 p. s. i. (temperature of 212° C.), has approximately the same effect as treatment for 5 seconds with steam at 1000 p. s. i. (temperature of 285° C.).

In general, the longer the steam treatment is continued at a given temperature, the higher is the proportion of the freed soluble lignin, and such longer steam treatment is preferable in case the lignin is to be extracted from the steam-treated ligno-cellulose material. For example, wood chips subjected to steam raised to 600 p. s. i. in 30 seconds, then raised to 1000 p. s. i. and held for 5 seconds, followed by preferably explosive disintegration, provide a material which contains a good proportion of extractible lignin, as for example 10 to 12% on dry weight of chips. Higher yields of such lignin can be extracted from ligno-cellulose material given a steam treatment of 15 or more seconds with steam at 1000 p. s. i., for example. For illustration, a typical figure for yield of soluble lignin from wood chips treated with steam at 1000 p. s. i. for 15 seconds and then disintegrated by explosive discharge, is about 17-18% based on dry weight of chips. The steam-treated and disintegrated material is preferably washed with water to largely remove the water-soluble organic acids, such as formic and acetic, and water-soluble derivatives of hemi-cellulosic material.

For extraction of the lignin from acid-hydrolyzed ligno-cellulose, dilute alkali solution, such as 1-3% sodium hydroxide solution for example, is preferably used, and the lignin precipitated by acidifying the solution, as for example by addition of hydrochloric acid, and then separated from the liquid by filtration. The separated lignin is preferably further treated with dilute mineral acid, such as hydrochloric or sulfuric, to set free any cations picked up in the process, filtered and washed with distilled water. Instead of carrying out the extraction with dilute alkali, organic solvents, such as ethylene glycol monomethyl ether for example, can be used to dissolve the lignin, and the lignin recovered by precipitating in water or by evaporating the solvent or in other ways. Treating the entire mass of hydrolyzed ligno-cellulose with such organic solvents is expensive and it is preferred to extract the lignin therefrom with dilute alkali solution and precipitate it, and then confine the treatment with the organic solvents to the lignin material so obtained. The lignin used for resin making in examples below was prepared by treatment of acid-hydrolyzed exploded wood fiber with 3% sodium hydroxide solution at a temperature of 50° C., and precipitated with dilute hydrochloric acid and washed as above described. Such lignin when precipitated and dried is light and fluffy.

Acid-hydrolyzed ligno-cellulose fiber for making sheet and the like products, or for providing filler material which may be used with the novel resins, is prepared, for example, by subjecting wood or other ligno-cellulose material to the action of high pressure steam. The hydrolysis treatment used for this purpose is, however, generally not so severe as that applied to ligno-cellulose material which is hydrolyzed for the purpose of providing material from which to obtain lignin by extraction. The less severe hydrolysis is applied in preparation of the fiber in order to retain a better degree of fiber structure. The hydrolyzed ligno-cellulose fiber made for example by subjecting wood chips to steam at 1000 p. s. i. for a period up to about 5 seconds and exploding has a good degree of fiber structure and contains about 12% lignin (based on the weight of the ligno-cellulose material) freed as a result of the hydrolysis. This lignin contained in the hydrolyzed ligno-cellulose material will readily react with the furfuryl alcohol. If desired, additional lignin may be added with the furfuryl alcohol to increase the amount of lignin resin in the final reaction product, and such additional lignin may or may not have been previously reacted with the furfuryl alcohol.

The following examples illustrate the preparation of resinous products in accordance with the present invention, and show their relatively high hardness and resistance to alkali and water. (Parts in the examples are parts by weight.)

*Example 1.*—282 parts commercial furfuryl alcohol and 75 parts lignin were stirred until the lignin was in solution. 150 parts of water containing 2.5 parts phthalic acid were next added and the mixture refluxed for 3 hours at 100° C., followed by vacuum evaporation for 2 hours during which time the temperature was gradually increased to 125° C. After this treatment, 243 parts of resin solution remained. The resulting resin was a thick, black, heavy, resinous liquid containing less than 1% water and soluble in ethylene glycol monomethyl ether.

The resin was further heated for 6 hours at 130° C. Its volatile content was then about 3%. The hard, resinous material so obtained was ground to pass through a 40-mesh screen.

A specimen was prepared by placing the powdered resin in a mold and heating and pressing at a temperature of 200° C. and a pressure of 2250 p. s. i. for a period of 5 minutes and chilling while under said pressure. The molded specimen had the following characteristics:

Specific gravity _____ 1.32
Hardness (Rockwell M) _____ 104
24 hour immersion in 1% alkali
    Per cent uptake _____ .1
    Color of alkali solution _____ Clear

*Example 2.*—450 parts commercial furfuryl alcohol, 60 parts lignin, 240 parts water and 4 parts phthalic acid were placed in a container and refluxed for 3 hours at about 100° C., followed by vacuum evaporation for 3 hours, reaching a temperature of 100° C. The yield was 428 parts of a resinous solution.

77 parts of this resinous solution were mixed with 100 parts of acid-hydrolyzed ligno-cellulose fiber together with 250 parts of ethylene glycol monomethyl ether. After thorough mixing in a mechanical mixer to form a mass of doughlike consistency, the resin-fiber mixture was placed in a wire basket and heated for 35 minutes in an oven at 150° C. The resin-fiber mixture so obtained contained about 6% volatiles. This material was ground to pass through a 40-mesh screen. After grinding, the powdered resin-fiber mixture was heated further until the volatile contents were reduced to about 2.5%.

A specimen was prepared by placing the powdered resin-fiber mixture in a mold and heating and pressing at a temperature of 200° C. and a pressure of 1750 p. s. i. for a period of 5 minutes and chilling while under said pressure. The molded specimen had the following characteristics:

Specific gravity _____ 1.38
Modulus of rupture (p. s. i.) _____ 10,190
Hardness (Rockwell M) _____ 103
24 hour immersion in water
    Per cent uptake _____ .5
24 hour immersion in 1% alkali
    Per cent uptake _____ 2.7

*Example 3.*—113 parts commercial furfuryl alcohol and 20 parts lignin were stirred until solution of the lignin was substantially complete. Then .5 parts iodine, dissolved in 10 parts dioxane, was added stepwise in 5 equal portions. Upon addition of the iodine, heat was evolved from the reaction and through the stepwise additions the temperature was maintained at about 95° C. for about 1 hour. The resin solution was placed in a vacuum oven at a temperature of 80° C. for 4 hours. The thus formed resinous mass was insoluble in methyl alcohol.

After further heating of the resin at 95° C. for about 28 hours, the resin was ground and passed through a 40-mesh screen.

A specimen was made from the powdered resin by heating and pressing in a mold at a temperature of 175° C. and a pressure of 1750 p. s. i. for a period of 15 minutes and chilling while said pressure. The specimen had the following properties:

| | |
|---|---|
| Specific gravity | 1.31 |
| Hardness (Rockwell M) | 98 |
| 24 hour immersion in 1% alkali | |
| Per cent uptake | .45 |
| Per cent swell | Nil |
| Color of solution | Clear |

*Example 4.*—294 parts commercial furfuryl alcohol, 88 parts lignin, 160 parts water and 2.6 parts furoic acid were refluxed for about 14 hours at 100° C., followed by vacuum evaporation for 3 hours at a temperature gradually increased to 120° C. The resin solution was stoved for 12 hours at 125° C. and the volatiles reduced to about 5%. The resinous mass was ground and passed through a 40-mesh screen, and then stoved for 1 hour at 130° C. The volatile content after stoving was less than 1%.

A specimen was made from the powdered resin by heating and pressing in a mold at a temperature of 200° C. and a pressure of 1750 p. s. i. for a period of 5 minutes and chilling while under said pressure. The specimen had the following characteristics:

| | |
|---|---|
| Specific gravity | 1.32 |
| Hardness (Barcol)[1] | 107 |
| 24 hour immersion in water | |
| Per cent uptake | .2 |
| 24 hour immersion in 1% alkali | |
| Per cent uptake | .3 |

([1] Barcol hardness given in Examples 4, 5 and 6 is adjusted to be about equal to Rockwell M hardness.)

*Example 5.*—98 parts commercial furfuryl alcohol, 25 parts lignin and .3 parts boron trifluoride (dissolved in ethyl ether) were heated on a water bath for about 10 hours at 70° C., followed by heating in an oven for 1½ hours at 125° C. The volatile content of the resinous mass after heating was about 6.4%.

The resinous mass was ground and passed through a 40-mesh screen, and then heated for about 20 minutes at 125° C. to further reduce the volatile content. The volatile content was then less than 1%.

A specimen was made from the powdered resin by heating and pressing in a mold at a temperature of 200° C. and a pressure of 1750 p. s. i. for a period of 5 minutes and chilling while under said pressure. The specimen had the following characteristics:

| | |
|---|---|
| Specific gravity | 1.32 |
| Hardness (Barcol) | 109 |
| 24 hour immersion in water | |
| Per cent uptake | .36 |
| 24 hour immersion in 1% alkali | |
| Per cent uptake | .4 |

*Example 6.*—226 parts furfuryl alcohol, 68 parts lignin, 300 parts water and 2.66 parts 85% phosphoric acid were refluxed for 2 hours at a temperature of 100° C., followed by vacuum evaporation until the resin acquired a taffy-like consistency. The resin was placed in an oven for 8 hours at a temperature of 125° C. The volatile content of the resinous mass so obtained was about 15%.

This resinous mass was ground and passed through a 40-mesh screen, and then heated for 1 hour at a temperature of 125° C. The volatile content was then less than 1%.

A specimen was made from the powdered resin by heating and pressing in a mold at a temperature of 200° C. and a pressure of 1750 p. s. i. for a period of 5 minutes and chilling while under said pressure. The specimen had the following characteristics:

| | |
|---|---|
| Specific gravity | 1.31 |
| Hardness (Barcol) | 107 |
| 24 hour immersion in water | |
| Per cent uptake | .2 |
| 24 hour immersion in 1% alkali | |
| Per cent uptake | .25 |

*Example 7.*—235 parts commercial furfuryl alcohol, 170 parts water and 2.5 parts phthalic anhydride were refluxed for 3 hours at a temperature of 100° C., followed by vacuum evaporation for 8 hours at a temperature of 55° C. and then for 6 hours more at 90° C. The yield was 187 parts of heat treated furfuryl alcohol resin with an acid number of 3.5 (milligrams sodium hydroxide per gram sample) and containing 93% solids.

Acetone was added to the heat treated furfuryl alcohol resin in quantity adapted to thin out the resin sufficiently so that the resin solution could be sprayed on surfaces. The thinned resin solution was sprayed on both sides of a sheet (specific gravity about .6) prepared from acid-hydrolyzed lignocellulose fiber. The sheet, after removal of acetone by heating in an oven at about 60° C. contained 6.4 parts resin to 100 parts of substantially bone-dry fiber.

The resin-fiber sheet containing about 5% moisture was then subjected to a pressure of 2000 p. s. i. for 2 minutes between platens at 210° C., after first breathing (reducing the pressure on the press to permit escape of vapors) at low pressure, viz. about 100 p. s. i., 2 times at 45-second intervals to produce a hardboard product.

Another hardboard specimen was prepared under the same conditions, but contained no added partially polymerized furfuryl alcohol resin.

A comparison of the two hardboards is given in the following table:

| | Resin Added | No Resin Added |
|---|---|---|
| Specific Gravity | 1.26 | 1.18 |
| Modulus of Rupture, p. s. i.: | | |
| Dry | 9,500 | 7,500 |
| Wet (24 Hour Immersion) | 9,700 | 2,750 |
| M. E. | 1,130,000 | 678,000 |
| Rockwell "R" Hardness | 114 | 97 |
| Immersion in Water: Percent Uptake (24 Hours) | 2.5 | 16.5 |
| Immersion in .5% Alkali: Percent Uptake (24 Hours) | 3.6 | 37.0 |

*Example 8.*—A hydrolyzed ligno-cellulose board having specific gravity of 1.00 and volatile content of about ½% based on the weight of the board was immersed for about 1 minute in a bath of heat treated furfuryl alcohol resin (prepared as described in Example 7) heated to a temperature of about 125° C. The board took up 10.6% (per cent on weight of board) resin during the immersion. The impregnated board was wiped free of excess resin and heated for about 4 hours in an oven at 160° C. to further promote the reaction between the heat treated furfuryl alcohol resin and the lignin in the ligno-cellulose board.

The physical properties of the board containing the heat treated furfuryl alcohol-lignin resin (formed in situ) as compared to a similar board treated in the same way but containing no added heat treated furfuryl alcohol resin were as follows:

|  | Resin Added | No Resin Added |
|---|---|---|
| Specific Gravity | 1.07 | 1 |
| Modulus of Rupture, p. s. i.: | | |
| Dry | 10,300 | 6,150 |
| Wet (24 Hour Immersion) | 8,825 | 3,150 |
| Rockwell (R) Hardness | 66 | 29 |
| Immersion in Water: Per Cent Uptake (24 Hours) | 4.7 | 18 |
| Immersion in .5% Alkali: Per Cent Uptake (24 Hours) | 11 | 39.7 |

It is to be understood that the specific data and procedures given are for illustration only and not for limitation; and the breadth of the invention is as defined in the claims.

We claim:

1. Process of preparing a water and alkali resistant fibrous product, which comprises heating a solution in which the reactive components consist of furfuryl alcohol, lignin and an acid catalyst to form a resinous material, heating the resinous material to substantially reduce the volatile content, mixing the resinous material with acid-hydrolyzed ligno-cellulose fiber, and subjecting the mixture to heat and pressure, said lignin being present in quantities up to 60% based on the weight of the furfuryl alcohol.

2. Process as defined in claim 1, and wherein the catalyst is phthalic acid.

3. Process as defined in claim 1, and wherein the catalyst is iodine.

4. Process as defined in claim 1, and wherein the catalyst is boron trifluoride.

RAYMOND NORRIS EVANS.
ANGELO PAUL INGRASSIA.

REFERENCES CITED

The following references are of record in the file of this patent:

UNITED STATES PATENTS

| Number | Name | Date |
|---|---|---|
| 2,243,481 | Meiler | May 27, 1941 |
| 2,325,570 | Katzen | July 27, 1943 |
| 2,343,973 | Harvey | Mar. 14, 1944 |
| 2,366,049 | Payne | Dec. 26, 1944 |
| 2,367,312 | Reineck | Jan. 16, 1945 |
| 2,377,995 | Coes | June 12, 1945 |
| 2,383,793 | Harvey | Aug. 28, 1945 |
| 2,392,162 | Lewis | Jan. 1, 1946 |
| 2,404,840 | Harvey | July 30, 1946 |
| 2,432,890 | Hersh | Dec. 16, 1947 |
| 2,437,955 | Hersh | Mar. 16, 1948 |